A. FUHR.
ROTARY POWER HOE.
APPLICATION FILED AUG. 22, 1912.

1,061,235. Patented May 6, 1913.

Witnesses:
Charles B. Brompton
Fred Pohl

Inventor:
Adam Fuhr
by Broyden Marks
Attorney.

UNITED STATES PATENT OFFICE.

ADAM FUHR, OF MANNHEIM, GERMANY, ASSIGNOR TO THE FIRM OF HEINRICH LANZ, OF MANNHEIM, GERMANY.

ROTARY POWER-HOE.

1,061,235.  Specification of Letters Patent.  Patented May 6, 1913.

Application filed August 22, 1912. Serial No. 716,457.

*To all whom it may concern:*

Be it known that I, ADAM FUHR, subject of the Grand Duke of Baden, residing at 38 Seckenheimerstrasse, Mannheim, Grand Duchy of Baden, Germany, have invented certain new and useful Improvements in Rotary Power-Hoes, of which the following is a specification.

This invention relates to rotary power hoes and the like for agricultural implements and the object of the present invention is to so construct the hoes that more or less uneven and even stony ground can be hoed without damage to the cutters.

According to the present invention the disks carrying the cutting hoes are mounted on the driving shaft in such a manner as to rotate in unison therewith but be capable of individual backward rotation on the driving shaft on the cutting hoes meeting insurmountable obstacles, so as to be automatically thrown out of action and pass over the obstacle, whereupon the cutting hoes again rotate in unison with the driving shaft and are thus brought again into operation.

In order that my invention may be more clearly understood, reference is made to the accompanying drawings which show, by way of example, one preferred form of constructing the hoe.

Figure 1:
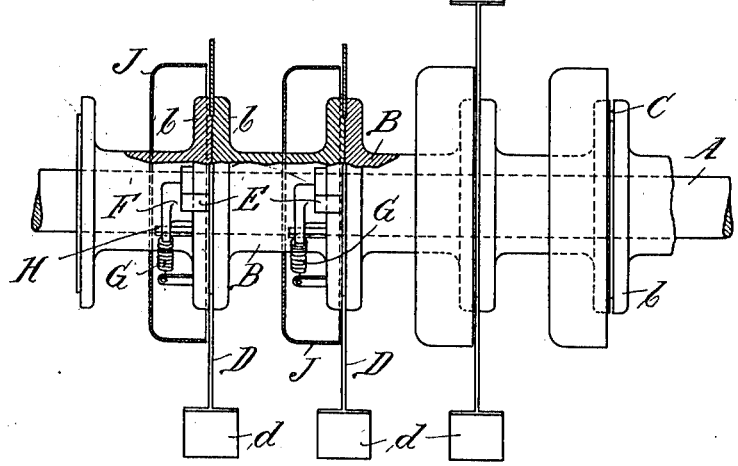
Figure 2:
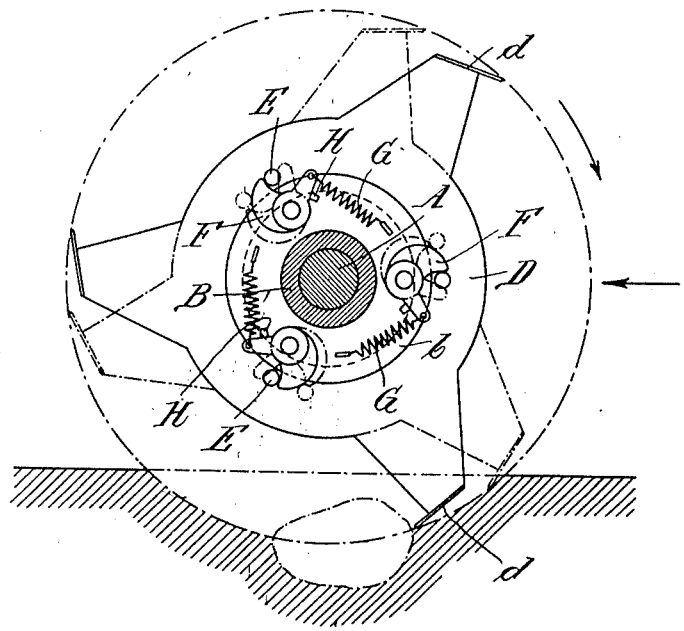

Figure 1 is a rear view of the hoeing mechanism, part being shown in section. Fig. 2 is an end view of Fig. 1 partly in section.

A designates the driving shaft upon which are keyed a plurality of flanged bosses B whose flanges *b* are recessed on their inner faces so as to form grooves C between juxtaposed flanges in which are loosely and rotatably mounted the disks D carrying the cutting hoes *d*. Projecting laterally from each disk D is a plurality of pins E, each pin being adapted to engage one arm of a catch or bell crank F pivotally mounted on the flange *b*. The catches F are normally held in engagement with the pins E by means of springs G, the movement being limited by means of a suitable stop H. The parts are preferably inclosed within a casing J to protect the same from dust and the like.

The operation of the hoeing mechanism is as follows:—The disk D is normally rotated in unison with the driving shaft A in the direction of the arrow in Fig. 2 through the catches F and pins E, thus springs G being such that the cutting hoes *d* will not yield to any resistance within normal limits. If the cutting hoes meet an obstacle offering slightly more than normal resistance, the disk D will slightly slip on the driving shaft A and thus tension the springs G, which will contribute to overcoming the resistance offered by the obstacle. If now, however, for example, the cutting hoe *d* meets a large stone or other obstacle presenting an insurmountable resistance, the disk D will remain stationary, while the driving shaft A continues to rotate, so that the pins E will force back the catches F against the action of the springs G until clear of the catches F and until the pin E is caught by the next succeeding catch F, whereupon the disk D will again rotate in unison with the driving shaft A, provided the hoe *d* has passed over the obstacle. It will thus be seen that the possibility of the hoes *d* being damaged is prevented and the hoeing mechanism thrown out of action, should an insurmountable obstacle be met and that the mechanism automatically again enters into operation after having passed over the obstacle.

I claim:—

1. A rotary power hoe, comprising a driving element, an element driven thereby, carrying a hoe and capable of complete rotation relatively to the driving element, a member projecting from one of said elements, and a member arranged on the other element, said members being normally held in yieldable contact but adapted to be moved out of contact with each other, so that the driven element moves in one direction in unison with the driving element, but is capable of movement relative thereto in the opposite direction until arrested by said members again moving into contact with each other.

2. A rotary power hoe, comprising a driving element, an element driven thereby and carrying a hoe, a plurality of pins projecting from one of said elements, and a yieldable member arranged on the other element, the single member on the one element and the pins on the other element, in succession, being normally held in yieldable contact, so that the driven element moves in one direction in unison with the driving element, but is capable of movement relative thereto in the opposite direction, until arrested by contact of the single member with one of said pins.

3. A rotary power hoe, comprising a driving element, an element driven thereby and carrying a hoe, a pin projecting from one of said elements, and a plurality of yieldable members arranged on the other element, the pin and the other members, in succession, being normally held in yieldable contact, so that the driven element moves in one direction in unison with the driving element, but is capable of movement relative thereto in the opposite direction, until arrested by contact of the pin with one of the other members.

4. A rotary power hoe, comprising a driving element, an element driven thereby and carrying a hoe, a pin projecting from one of said elements, and a spring-controlled catch arranged on the other element, said catch being normally held in contact with said pin but the latter being movable out of contact therewith, so that the driven element moves in one direction in unison with the driving element, but is capable of movement relative thereto in the opposite direction, until arrested by the pin again moving into contact with the catch.

5. A rotary power hoe, comprising a driving element, an element driven thereby and carrying a hoe, a plurality of pins projecting from one of said elements, and a plurality of spring controlled catches arranged on the other element, said catches being normally held in contact with said pins but the latter being movable out of contact therewith, so that the driven element moves in one direction in unison with the driving element, but is capable of movement relative thereto in the opposite direction, until arrested by the said pins again coming into contact with the catches.

6. A rotary power hoe, comprising a driving shaft, a plurality of flanged bosses keyed thereon and whose flanges are shouldered to form grooves between juxtaposed flanges, a plurality of disks carrying the cutting hoes loosely mounted in said grooves, a plurality of pins projecting laterally from said disks and a plurality of spring-controlled catches pivoted to said flanges for engaging said pins and for releasing same when the cutting hoes meet insurmountable obstacles and for immediately thereafter reëngaging said pins.

In testimony whereof I affix my signature in presence of two witnesses.

ADAM FUHR.

Witnesses:
WULFGANG ADOLF MÜLLER,
KARL WALTHER.